United States Patent

Ho

[11] Patent Number: 6,059,384
[45] Date of Patent: May 9, 2000

[54] COMPUTER HOUSING AND FOOT MEMBER ARRANGEMENT FOR A VERTICAL COMPUTER

[76] Inventor: Hsin Chien Ho, 20-1F, 268, Sec.1, Wen-Hua Road, Pan Chiao City, Taipei, Taiwan

[21] Appl. No.: 09/159,825

[22] Filed: Sep. 23, 1998

[51] Int. Cl.[7] .................................................. F16M 1/00
[52] U.S. Cl. ..................................... 312/223.2; 312/265.6; 248/676; 248/346.04; 248/918
[58] Field of Search ............................... 312/223.2, 265.6, 312/265.5, 351.1, 351.2, 213; 248/676, 918, 346.04, 346.03, 176.1, 678

[56] References Cited

U.S. PATENT DOCUMENTS

| | | | |
|---|---|---|---|
| D. 341,280 | 11/1993 | Garmon | D14/114 |
| D. 361,561 | 8/1995 | Baudot | D14/114 |
| D. 383,728 | 9/1997 | Yurkonis et al. | D14/100 |
| 4,786,121 | 11/1988 | Lyons | 312/350 |
| 4,949,934 | 8/1990 | Krenz et al. | 248/676 X |
| 5,192,046 | 3/1993 | Howard | 248/676 |

*Primary Examiner*—Ramon O. Ramirez
*Assistant Examiner*—Stephen S. Wentsler
*Attorney, Agent, or Firm*—Dougherty & Troxell

[57] ABSTRACT

A computer housing and foot member arrangement includes a foot member having a top receiving space and spring retainers bilaterally disposed in the top receiving space, a vertical computer housing inserted into the top receiving space, and a coupling plate connected between the foot member and the vertical computer housing to fix the vertical computer housing to the foot member, the coupling plate having two longitudinal grooves respectively forced into engagement with the spring retainers, hooks and a stop plate respectively forced into engagement with respective locating holes at a bottom wall of the vertical computer housing.

1 Claim, 5 Drawing Sheets

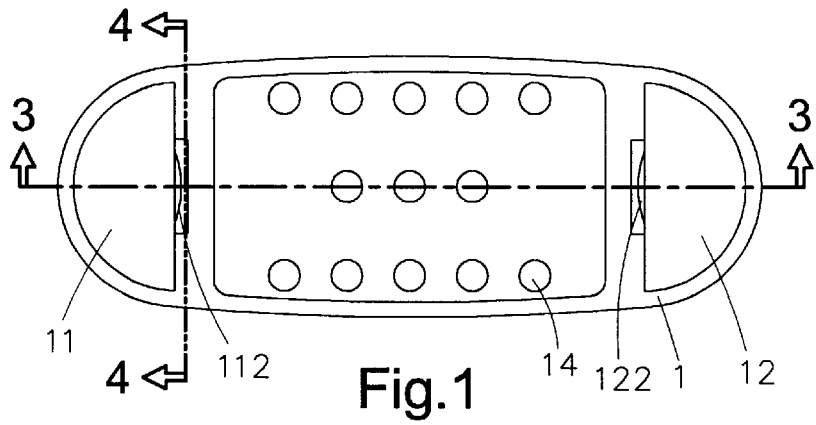
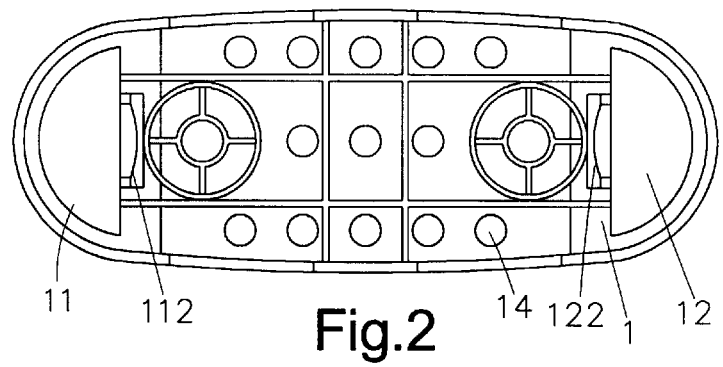
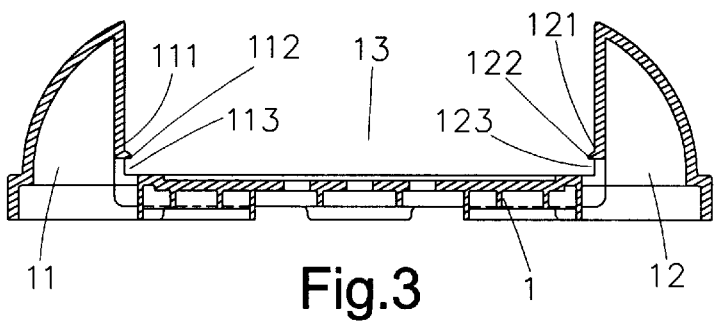
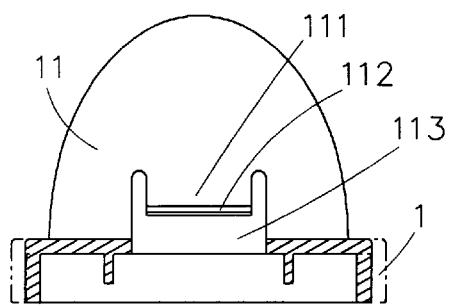
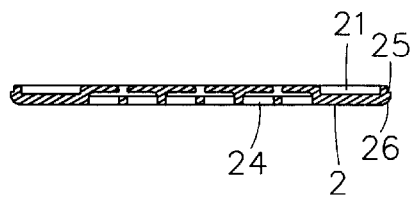

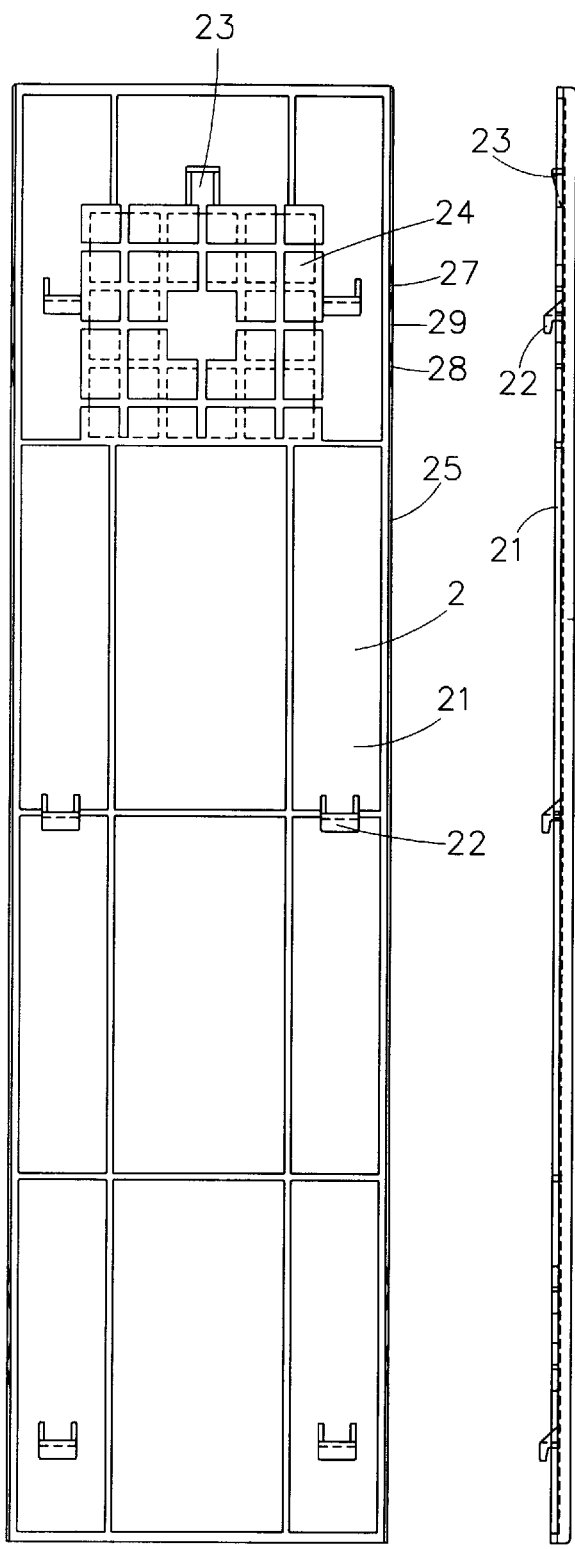
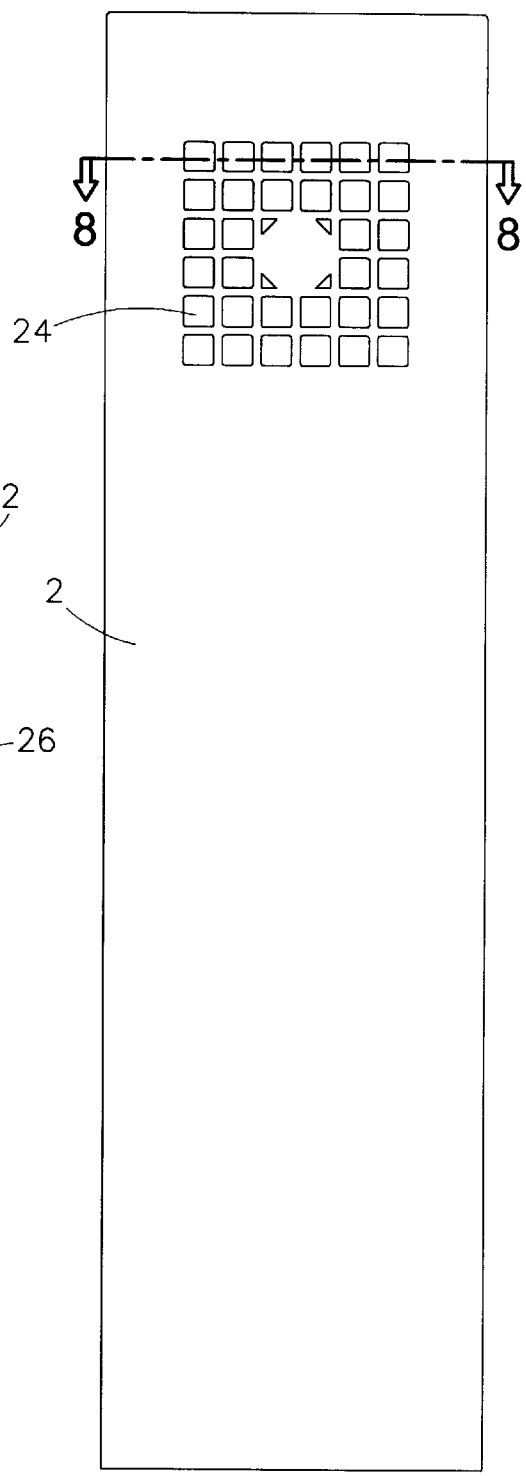
Fig.5　　　Fig.6　　　Fig.7

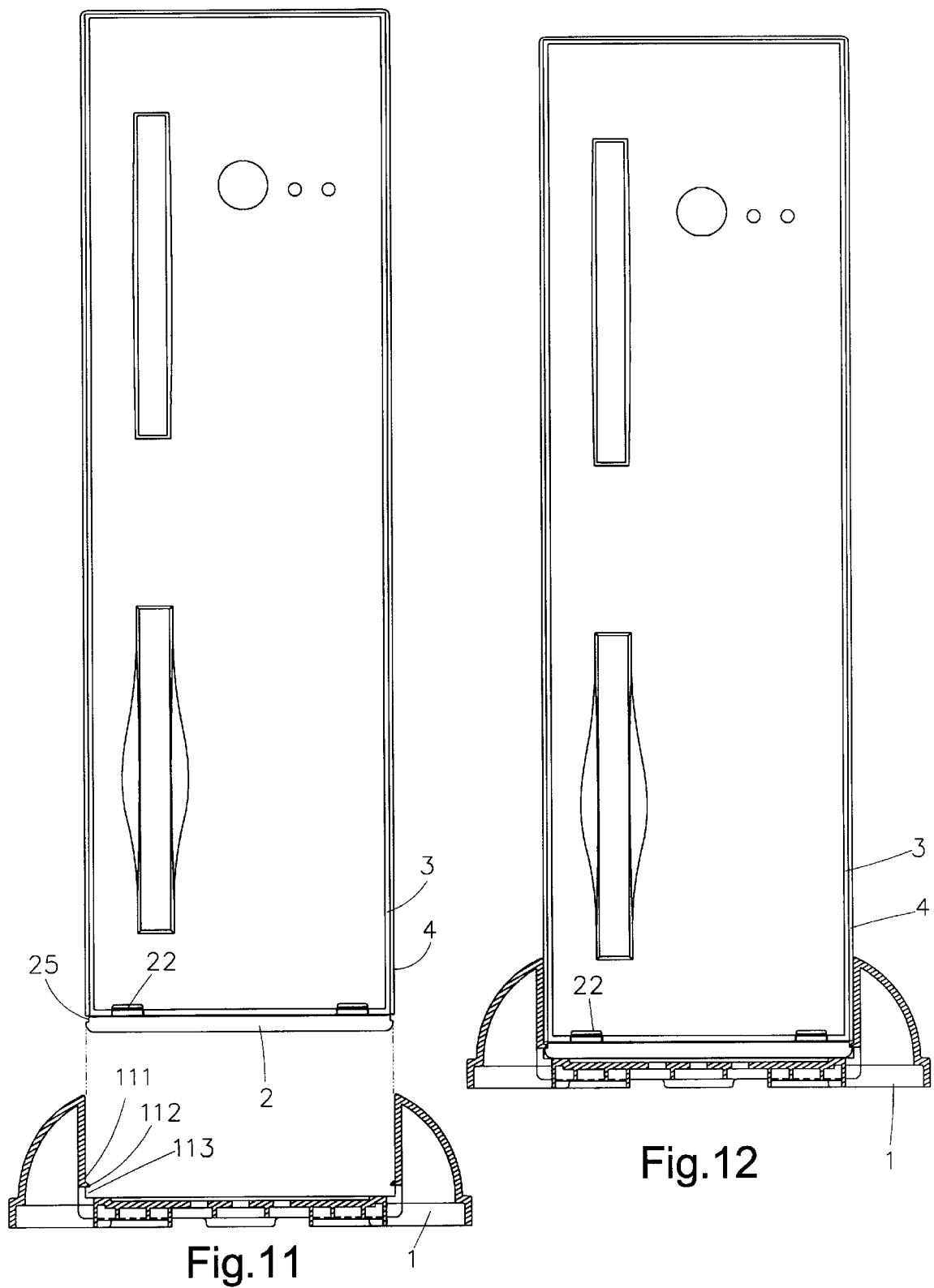

6,059,384

COMPUTER HOUSING AND FOOT MEMBER ARRANGEMENT FOR A VERTICAL COMPUTER

BACKGROUND OF THE INVENTION

The present invention relates to a vertical computer, and more specifically to a computer housing said foot member arrangement for a vertical computer.

Regular desk-top personal computers include two types, namely, the vertical type and the horizontal type. Because a vertical computer has a narrow bottom wall, it tends to fall when vibrated or pushed by an external force.

SUMMARY OF THE INVENTION

The present invention provides a foot member for a vertical computer housing enabling the vertical computer housing to be stably maintained in place on a flat surface for example the top of a table. A coupling plate is provided to secure the vertical computer housing to the foot member. The foot member comprises a bottom wall, two upright stop walls bilaterally raised from the bottom wall, a receiving space defined between the upright stop walls, a plurality of vent holes through said bottom wall, and two spring retainers respectively provided at the connecting areas between said upright stop walls and the bottom wall, the spring retainers each comprising a hooked portion. The vertical computer housing is mounted in the foot member with the receiving space, having a plurality of locating holes on a bottom wall thereof. The coupling plate comprises a recessed center area pairs of hooks and a stop block provided in the recessed center area and respectively fastened to the locating holes at the bottom wall of the computer housing, a plurality of air vents disposed within the recessed center area, two longitudinal grooves symmetrically disposed at two opposite long sides thereof and forced into engagement with the hooked portions of the spring retainers, a smoothly chamfered peripheral edge, and sets of arched blocks symmetrically provided in the longitudinal grooves, the sets of arched blocks each defining an arched recessed portion through which the hooked portions of the spring retainers pass into engagement with the longitudinal grooves of the coupling plate

BRIEF DESCRIPTION OF THE DRAWINGS

FIG. 1 is a top view of a foot member according to the present invention.

FIG. 2 is a bottom view of the foot member shown in FIG. 1.

FIG. 3 is a longitudinal view in section of the foot member shown in FIG. 1.

FIG. 4 is a transverse view in section of the foot member shown in FIG. 1.

FIG. 5 is a top view of a coupling plate according to the present invention.

FIG. 6 is a side view of the coupling plate shown in FIG. 5.

FIG. 7 is a bottom view of the coupling plate shown in FIG. 5.

FIG. 8 is a transverse view in section of the coupling plate shown in FIG. 5.

FIG. 11 is a schematic drawing showing the connection between the foot member and the assembly of the coupling plate and the computer housing (before connection).

FIG. 12 is similar to FIG. 11 but showing the coupling plate fixed to the foot member.

DETAILED DESCRIPTION OF THE PREFERRED EMBODIMENT

Figure 9:
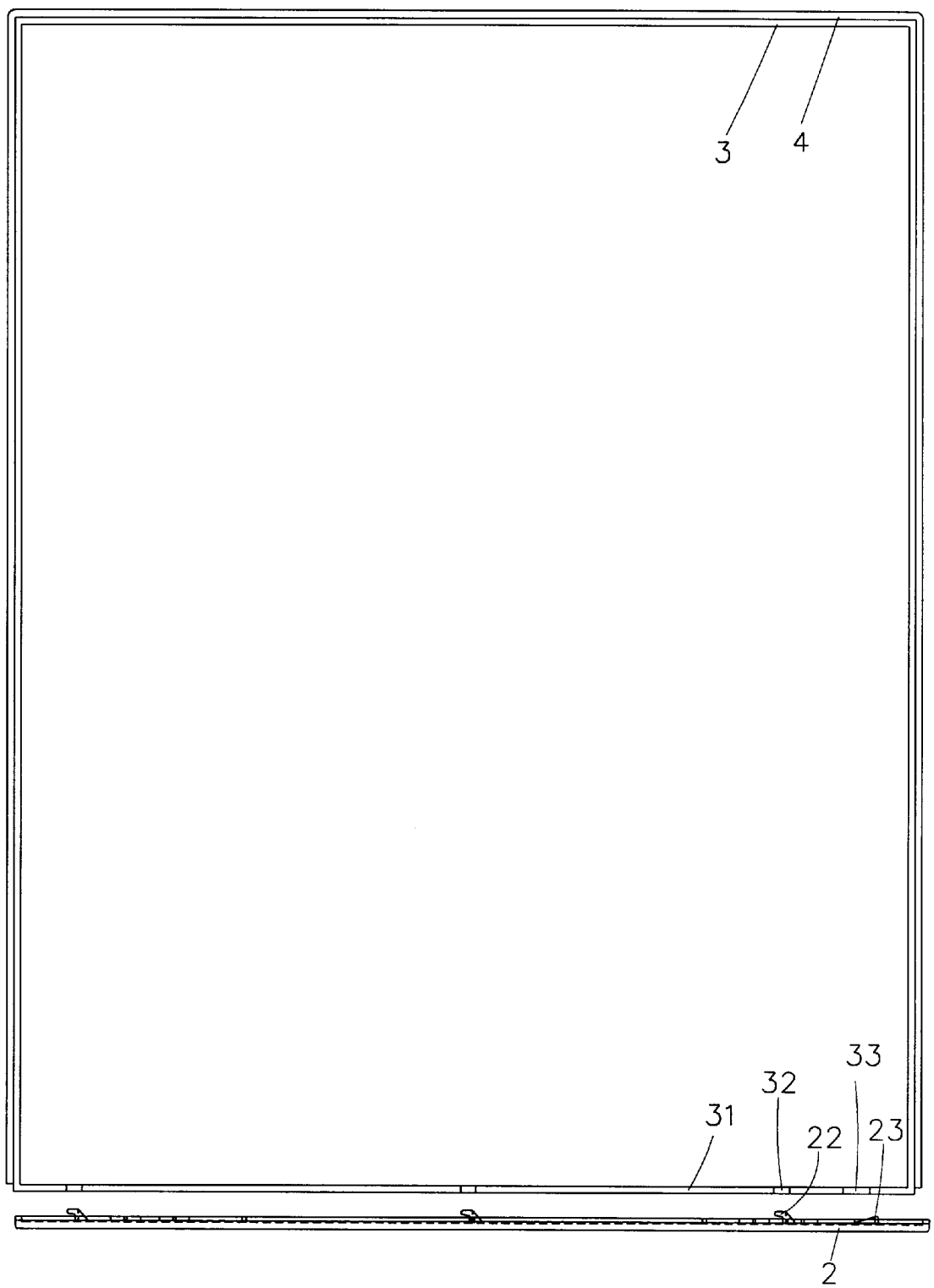
FIG. 9 is a schematic drawing showing the connection between the computer housing and the coupling plate (before connection).
Figure 10:
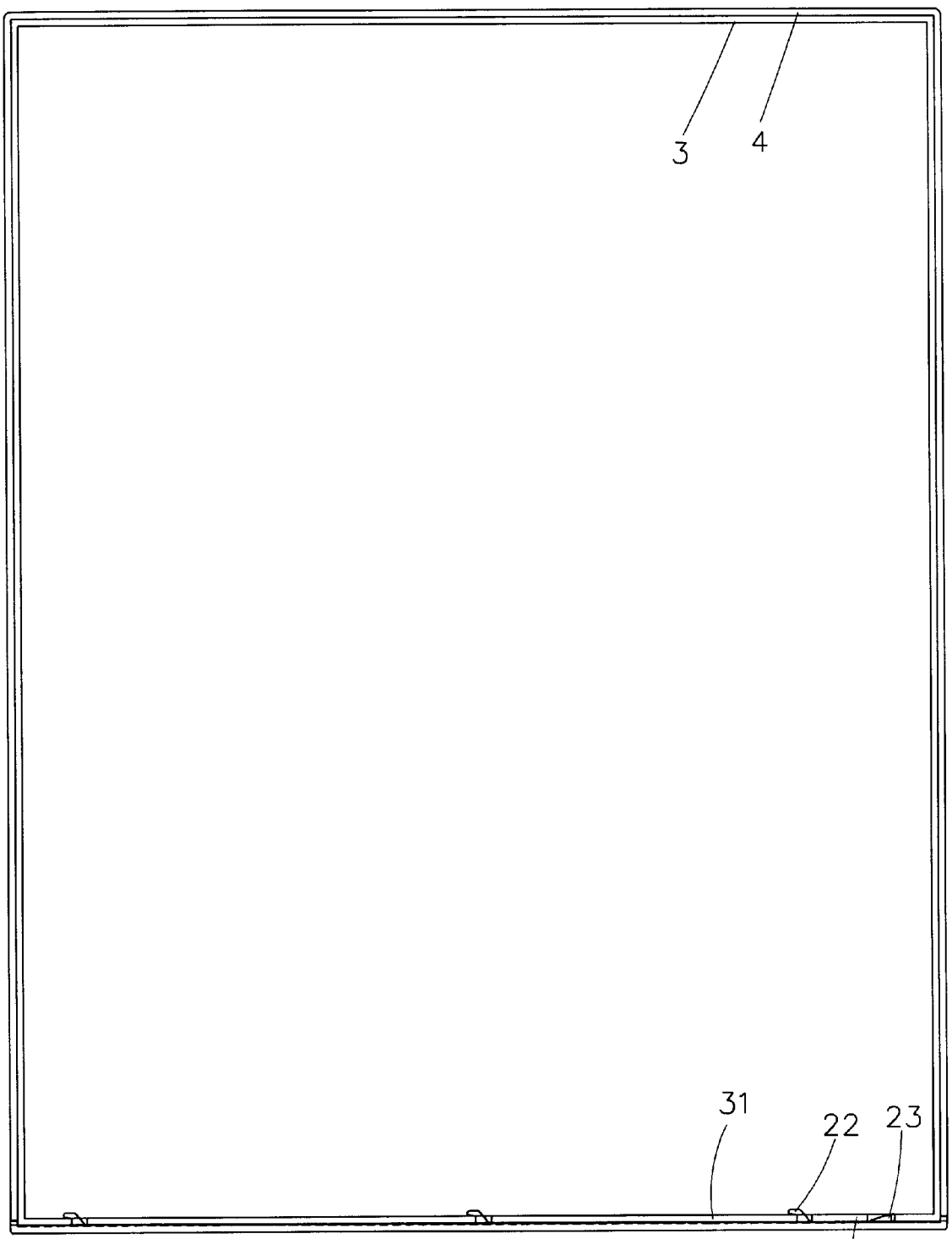
FIG. 10 is similar to FIG. 9 but showing the coupling plate fixed to the bottom wall of the computer housing.

Referring to Figures from 1 through 12, the present invention is generally comprised of a substantially U-shaped foot member 1, a coupling plate 2, and a computer housing 3.

Referring to Figures from 1 through 4, the foot member 1 is injection-molded from plastics comprising two upright stop walls 11,12 bilaterally raised from the top side of the bottom wall thereof, a receiving space 13 defined between the upright stop walls 11,12 for holding a vertical computer housing on th bottom wall, a plurality of vent holes 14 through the bottom wall and two spring retainers 111,121 respectively provided at the connecting areas between the upright stop walls 11,12 and the bottom wall. The upright stop walls 11,12 each have a smoothly curved outer surface. The spring retainers 111,121 each comprise a hooked portion 112 or 122 and define a retaining space 113 or 123.

Referring to Figures from 5 through 8, the coupling plate 2 comprises a recessed center area 21, pairs of hooks 22 provided in the recessed center area 21, a stop block 23 provided in the recessed center area 21 near one end, a plurality of air vents 24 disposed Within the recessed center area 21 near the stop block 23, two longitudinal grooves 25 symmetrically disposed at two opposite long sides thereof, a smoothly chamfered peripheral edge 26, and sets of arched blocks 27,28 symmetrically provided in the longitudinal grooves 25, each set of arched blocks 27,28 defining an arched recessed portion 29.

Referring to FIG. 9, the computer housing 3 is peripherally covered with a plastic (or metal) cover 4, having a bottom wall 31 and locating holes 32,33 corresponding to the hooks 22 and stop block 23 of the coupling plate 2.

Referring to Figures from 9 through 12, the coupling plate 2 is fastened to the bottom wall 31 of the computer housing 3 by forcing the hooks 22 and stop block 23 of the coupling plate 2 into engagement with the locating holes 32,33 at the bottom wall 31 of the computer housing 3, then the computer housing 3 is inserted with the coupling plate 2 into the receiving space 13 between the upright stops 11,12 permitting the chamfered peripheral edge 26 of the coupling plate 2 to pass over the hooked portions 112,122 into the retaining spaces 113,123. When the chamfered peripheral edge 26 of the coupling plate 2 is moved over the hooked portions 112,122 into the retaining spares 113,123, the hooked portions 112,122 of the foot member 1 are respectively engaged into the longitudinal grooves 25 at the coupling plate 2. If the arched recessed portions 29 of the coupling plate 2 are not aimed at the hooked portions 112,122 during the insertion of the computer housing 3 into the receiving space 13, the computer housing 3 is moved forwards or backwards in the receiving space 13, enabling the hooked portions 112,122 to be respectively moved through the arched recessed portions 29 into engagement with the longitudinal grooves 25. By repeating the aforesaid procedure reversely, the computer housing 3 is disconnected from the foot member.

What the invention claimed is:

1. A computer housing and foot member arrangement comprising:

a foot member injection-molded from plastics, said foot member comprising a bottom wall, two upright stop walls bilaterally raised from said bottom wall, a receiving space defined between said upright stop walls, a plurality of vent holes through said bottom wall, and two spring retainers respectively provided at the connecting areas between said upright stop walls and said bottom wall, said spring retainers each comprising a hooked portion;

a computer housing mounted in said foot member within said receiving space, said computer housing having a plurality of locating holes on a bottom wall thereof;

a coupling plate coupled between said computer housing and said foot member, said coupling plate comprising a recessed center area, pairs of hooks and a stop block provided in said recessed center area and respectively fastened to the locating holes at the bottom wall of said computer housing, a plurality of air vents disposed within said recessed center area, two longitudinal grooves symmetrically disposed at two opposite long sides thereof and forced into engagement with the hooked portions of said spring retainers of said foot member, a smoothly chamfered peripheral edge, and sets of arched blocks symmetrically provided in said longitudinal grooves, said sets of arched blocks each defining an arched recessed portion through which the hooked portions of said spring retainers of said foot member pass into engagement with the longitudinal grooves of said coupling plate.

* * * * *